United States Patent [19]

Murayama et al.

[11] 4,246,091
[45] Jan. 20, 1981

[54] PROCESS FOR THE ELECTROLYTIC TREATMENT OF ALKALI HALIDE

[75] Inventors: Naohiro Murayama; Makoto Fukuda; Sirou Sujuki; Teruo Sakagami, all of Iwaki, Japan

[73] Assignee: Kureha Kagaku Kogyo Kabushiki Kaisha, Tokyo, Japan

[21] Appl. No.: 883,675

[22] Filed: Mar. 6, 1978

[30] Foreign Application Priority Data

Mar. 4, 1977 [JP] Japan .................................. 52/23355
Sep. 14, 1977 [JP] Japan ................................. 52/110802

[51] Int. Cl.³ ............................................ C25B 13/08
[52] U.S. Cl. .................................................. 204/296
[58] Field of Search .......................... 204/296; 526/49

[56] References Cited

U.S. PATENT DOCUMENTS

| 3,562,139 | 2/1971 | Leitz ..................................... 204/296 |
| 3,821,127 | 6/1974 | Mizutani et al. ................. 204/296 X |
| 3,884,777 | 5/1975 | Harke et al. ............................ 204/84 |
| 3,884,885 | 5/1975 | Grot ................................... 526/49 X |
| 3,969,285 | 7/1976 | Grot .................................. 204/296 X |
| 3,985,631 | 10/1976 | Hora et al. ............................. 204/98 |
| 4,166,014 | 8/1979 | Sata et al. ............................... 204/98 |

FOREIGN PATENT DOCUMENTS

| 2434921 | 2/1975 | Fed. Rep. of Germany . |
| 2451846 | 5/1975 | Fed. Rep. of Germany . |
| 2209608 | 7/1974 | France . |
| 280830 | 9/1970 | U.S.S.R. ................................. 204/296 |

Primary Examiner—F. C. Edmundson
Attorney, Agent, or Firm—Fleit & Jacobson

[57] ABSTRACT

A process for the electronic treatment of alkali halide. Use is made of a cation exchange membrane having as its ion exchange radicals, sulfonic acid radicals. This membrane is treated with primary to tertiary monoamine or its salt or quatary ammonium salt and then heat-treated at a temperature higher than 100° C. and lower than melting point of the reaction product and then subjected to drying, so as to improving the cation-selecting performance of the membrane and to increase its current efficiency.

9 Claims, 1 Drawing Figure

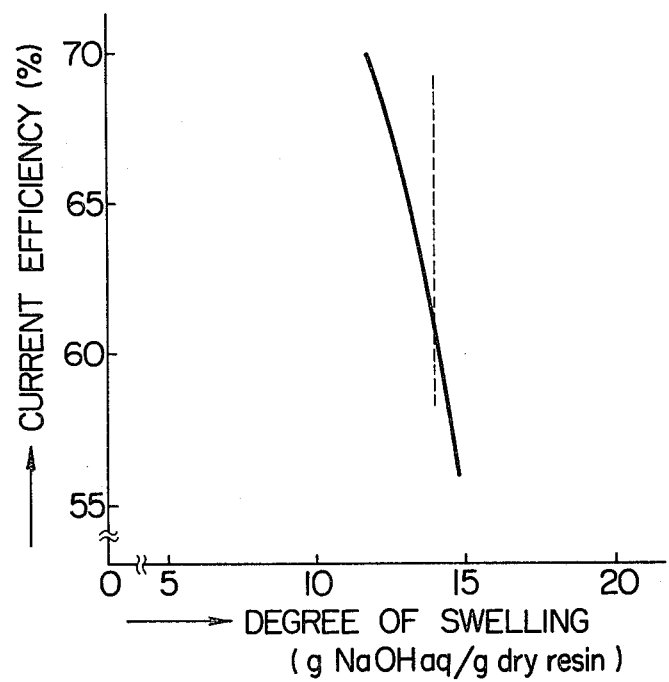

PROCESS FOR THE ELECTROLYTIC TREATMENT OF ALKALI HALIDE

BACKGROUND OF THE INVENTION

This invention relates to a process for the electrolytic treatment of alkali halide, and more specifically, it relates to the said kind of electrolytic process with use of a cation exchange membrane.

Cation exchange membrane finds its broad industrial usage in the process of electric dialysis, diffusion dialysis and the like, and as the separating membrane(s) in electrolytic reaction processes. Especially, in the latter, the membrane must represent a lower as possible electric resistance during the electrolysis, a superior selective permeability to anions or cations which are specifically and occasionally desired to pass therethrough, and physical and chemical stability during use. For use in the electrolytic treatment of alkali halide, chemical stability of the membrane is especially desired.

For satisfying this characteristic, the membrane is desirously made of fluorocarbon resin material. It has been experienced, however, that the fluorocarbon resin base cation exchange membrane works only inferiorly in the view point of chemical stability as well as selective permeability. Especially and generally speaking, when treating high concentration electrolytic solution, the performance of the membrane decreases to a substantial degree.

It should be noted that the selection of the membrane material decidingly depends upon the current efficiency in the electrolytic treatment of alkali halide solution. Therefore, in view of this fact, it has long been desired among those skilled in the art to provide a superior electrolytic membrane, having a better selective permeability for cations, and a lesser as possible electric resistance.

SUMMARY OF THE INVENTION

It is, therefore, the main object of the invention to provide a highly efficient process for the electrolytic treatment of alkali halide solution by the use of an improved cation exchange membrane.

According to the present invention, the cation exchange membrane carrying, as its ion exchange radical, sulfonic acid radical, is treated with any one of or any combination of salt(s) of primary to tertiary monoamines or altertively with quatary ammonium salt, for improving the ionic selectability.

It is a well acknowledged that the cation exchange membrane carrying sulfonic acid radicals as its ion exchange one, has an appreciable affinity to water on account of the specifically selected active ions. In this case, when the mother material resin has not been enough cross-linked, it will become liably swollen by contact with water or aqueous electrolytic solution, and with a higher content of the sulfonic acid radicals than a predetermined value, it may be frequently experienced that lesser ionic selectivity is encountered, the higher the sulfonic acid radicals are contained. In order to avoid such disadvantageous phenomenon, the degree of possible swelling may be advantageously lowered by applying further cross-linking treatment to the mother resin material to a proper degree. On the other hand, however, the cross-linked resin represents generally a difficulty in the machinability thereof. Although the ion exchange membrane must have a small as possible thickness, in order to represent a smaller as possible electric resistance, the cross-linked resin membrane is very difficult to have a prescribed small thickness, and indeed, on account of the said mechanical difficulty. In addition, it has been frequently experienced that the mechanical strength of the cross-linked resin membrane becomes smaller upon contact with water or aqueous electrolytic solution.

Taking the above facts into account, it is, therefore, highly preferable to provide ion exchange membranes representing a proper content of sulfonic acid radicals.

When considering the cation exchange membrane of fluorocarbon resin which is known as highly advantageous for the ion exchanger in the electrolytic treatment of alkali halide, the exchanger representing a lesser containing ratio of sulfonic acid radical-containing monomer relative to the fluorocarbon monomer, the difficulty in the mechanical workability will be tremendous on account of the abundant content of the fluorocarbon resin, and especially, in the case of the ion exchange membrane which requires to have its smaller as possible electric resistance, the required thin thickness is highly difficult to realize. When increasing the amount of such monomer as containing sulfonic acid radicals or those later transformable thereinto, beyond a predetermined limit for avoiding the above defect, the degree of swelling as appearing upon contact with water or aqueous solution will be disadvantageously high and the current efficiency as appearing during electrolysis of alkali halide will thus be inferior.

It is our proposal for avoiding these conventional defects to treat such cation exchange membrane carrying a relatively rich amount of sulfonic acid radicals, and indeed, with a salt of primary to tertiary monoamine or with quatary ammonium salt. By use of such modified and improved cation exchange membrane, the ionic selective permeability of the latter can be amazingly elevated during the course of electrolytic treatment of alkali halide solution.

As is commonly known, when sulfonic acid radical or its metal salt is reacted with salt of primary to tertiary monoamine or with quatary ammonium salt, a sulfonic acid-ammonium complex of the following form is liably provided:

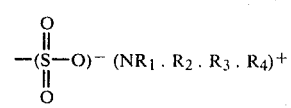

where $R_1$, $R_2$, $R_3$ or $R_4$ stands for hydrogen a radical liably forming ammonium bond.

Various prior proposals have been hitherto made to treat the cation exchange membrane with amine. As an example, Japanese Open Patent Specification Sho-50-92339 of 1975 discloses, as the amine, a polyamine, preferably ethylene diamine for the treatment of the membrane carrying radicals of $-SO_2X$, X being Cl or F. This proposed process has its object to provide a cross-linking reaction in the basic resin with the polyamine, whereby, however, the resulted bonding radical consists of sulfamide. According to our practical experiments, the above known process contributes to improve the ionic selectivity performance while disadvantageously increasing the electric resistance value of the membrane.

On the other hand, Japanese Open Patent Specification Sho-50-49394 of 1975 discloses that sulfonic acid radical of the cation exchange membrane is reacted with primary to tertiary amine salt or with quatary ammonium salt or the like, as is employed in the present invention and then, the reacted product is brought into melting. It should, however, be noted that this known process is directed to repair locally defective parts of the membrane by melting. It is disclosed in the Open Specification that the so repaired membrane parts represent a lower ion exchange performance than the remaining unrepaired part of the membrane.

It is stressed that the improved membrane according to this invention by treatment with primary to tertiary amine salt or with quatary ammonium salt can hold its improved ionic selective performance for an extended period under the electrolytic reaction conditions while keeping the electric resistance value at a low level.

It is believed as was disclosed hereinbefore that the improved membrane according to this invention comprises sulfonic acid-ammonium complex salt. According to the common knowledge, it can not be conceived that such type of complex salt as above is stable for an extended long period. In fact, the ammonium radical bonded with the sulfonic radical is separated almost all during the electrolytic operation period and replaced by the alkali metal ion(s). It is, therefore, surprising that the effect of amine or ammonium treatment can be maintained for a long time in the case of the present invention.

It has not yet been completely clarified why the ionic selective performance is highly superior with the improved membrane according to the invention, but the following reason may be attributed thereto as an important factor. There may thus conceived of substantial difference in the hydration mechanism.

Before an ion exchange membrane is suspended under tension in the electrolytic bath, it must be swollen to a certain degree for softening, and even with the membrane according to this invention, carrying the ammonium complex salt transformingly provided in the foregoing way and thermally after-treated in the manner to be set forth, it is necessary before suspension in the bath to preparatorily swell it with water or other suitable solvent. During the electrolytic process, the ammonium complex will be transformed to sulfonic acid—Na which is after all hydrated per se. It is thus be observed that both the conventional and inventive membranes carry equally the sulfonic acid—Na type component and are, therefore, similar to each other in chemical structure. It may be further observed that the membranes carrying sulfonic acid—Na component represent substantially similar hydrating power and must represent almost similar degree of swelling. In fact, however, there is a substantial difference in the operating performance between the membrane subjected to the improving treatment according to this invention and the conventional one having been untreated in the above sense and such difference in the anion-passing performance between these both, or more specifically, these ions find its way to pass through the swelling water component contained in the improved membrane, while in the conventional membrane the equally contained swelling water is not effect in this barrier effect.

It can be assumed that the hydrating water presenting relative to each of the sulfonic acid radicals is present in an intimately attracted manner thereby while any of other ions is discharged from inclusion in the sulfonic acid radical, and indeed, by virtue of the electrically negative nature of the sulfonic acid radicals. Therefore, if the swelling water is composed exclusively by the hydrating water components attributed to the sulfonic acid salts, anions are highly difficult to penetrate through the membrane. However, there are such aqueous components which are not influenced by the practically existing sulfonic acid radicals and the anions may pass through substantially freely via such aqueous components through the membrane. It is, therefore, conceivable that there may possibly be present a plenty quantity of swelling water in the area of the membrane which is not influenced by the presence of the practically included sulfonic radicals, if the membrane has not been subjected to the improving treatment according to the invention.

As a powerful reason for the above supposition, we have found that the once amine-treated membrane is treated further with a theremal treatment at a high temperature enough to invite thermal contraction for avoiding at such area where the sulfonic acid radicals have no influence in the above sense to remain voids into which aqueous components may invade after the removal of the hydrate water.

The above disclosed reason for increasing the ionic selective permeability is based only on an assumption. The reason may be attributed to the formation of the ammonium complex which may provide another favorable effect. It is further conceivable an occurence of a kind of rearrangement of the sulfonic acid radicals in the sense of stereoisomerism. After all, it should be noted that the membrane which has been subjected to the treatment with primary to tertiary monoamine or salt thereof or with quatary ammonium or its salt and to a heat treatment, carries liably and ionically dissociatable complex provisionally formed, which dissociates into corresponding component ions, and the thus improved membrane represents a highly improved current efficiency without inviting increased flow resistance, when the membrane is used for the electronic treatment of alkali halide, while in the comparative conventional membrane carrying sulfanide which is highly difficult to dissociate into corresponding ion components.

The amine usable in the present invention may preferably be a salt of primary secondary or tertiary amine, or quatary ammonium salt, having generally a form of the monoammonium structure of $(NR_1R_2R_3R_4)X$. In this general formula, $R_1$ may preferably stand for alkyl, aryl or aralkyl or its halogen derivative. $R_2$, $R_3$ or $R_4$ may stand for H or any one of those attributable to $R_1$. On the other hand, X stands for F, Cl, Br, I, OH or $NO_3$ or inorganic or organic acid radical preferably such as carboxylic acid radical as $CH_3COO$.

With such structure as $NH_4X$ where all the radicals $R_1$-$R_4$ standing for H, no favorable results have been attained according to our practical experiments.

When the hydrogen atoms of the alkyl or the like are replaced partially by certain hydrophilic radical such as -OH or -COOH, and thus, with use of alcoholic amine or amino acid, favorable effect can not be provided.

The cation exchange radical which is to be subject to reaction with the monoamine or its salt according to this invention may be sulfonic acid radical as the fixed ion exchange one, having totally ion exchange capacity of 0.2–3.0 meg/g. dry resin and there is no specific limitation thereto. Therefore, no only -$SO_3H$ or briefly of the H-type, but also -$SO_3Na$, -$SO_3K$ or the like briefly of the alkali metal salt type or still briefly of the salt type.

For the SO₃H-(salt) type, primary, secondary of tertiary, amine or its salt or quartary ammonium or its salt may be successfully utilized for the purpose of the invention. In the salt type such as -SO₃Na or -SO₃K, however, use of primary or secondary amine or its salt may lead to unfavorable results under occasion. It may be assumed that the reaction of ammonium salt can be executed to a satisfying degree with the H-type active radical while the reaction is executed only to an insufficient degree in the case of the salt type active radical such as -SO₃Na.

Since the monoamine salt usable in the invention is generally soluble in water, it is reacted in its aqueous solution with the cation exchange ion in the membrane, the concentration of the solution being preferably from 0.01 to 5.0 mol/lit.

The membrane is dipped in the solution, or alternatively, the latter may be coated on the former. Generally speaking the membrane in its entirely is brought into contact with the aqueous solution of monoamine salt. However, if occasion may desire the solution can be brought into contact with one surface of the membrane, so as to localize intentionally the desired improving effect.

The treating temperature is generally and practically unlimitted. It may frequently cover such a range between room temperature and the boiling point of the aqueous monoamine salt solution.

The dipping or coating period may differ with variation of the treating temperature. Generally, the period is max a week. Frequently, however, it is in the order of 24 hours.

The membrane subjected to the amine salt treatment is treated thermally, as was hinted hereinbefore. The heat treating temperature is generally higher than 100° C., rather preferably than 140° C. The possible uppermost temperature is selected to be a temperature slightly lower than the fusing temperature of the base resin material of the membrane.

On the other hand, the thermal treating period may extend generally from several minutes to 20 hours, depending upon the kind of the monoamine salt and the treating temperature.

In the present invention, this heat treatment is requisite. If this heat treatment should have been omitted, the originally improved ionic selective permeability could be occasionally maintained, while its durability may frequently and soon be lost within a relatively short period, thus the selectivity becoming to that of the untreated membrane.

The temperature of the heat treatment plays an important factor for the purpose of the invention. If the temperature be lower than 100° C., the durability period of the improved effect will become unacceptably short. With increase of the heat treating temperature, the treating period is preferably longer extended. When the membrane is subjected to a complete heat treatment especially at a temperature higher than 140° C., it has been found experimentally that the effectiveness of the improved membrane is subjected to substantially no adverse aging effect, thus being the most preferable membrane condition in the view point of desired improveness.

On the other hand when the membrane should have been subject to a heat treatment at a higher temperature than the fusing point of the base resin material of the membrane improved by the advance treatment with amine- or ammonium salt, the membrane may be suffered from undue thermal distortion or represent defective perforations, but also it may be undesirously desulfonated or even cross-linked thereby increasing disadvantageously the electric resistance and inviting a substantial decrease of the ion exchange performance. Although the fusing point of the membrane resin per se varies with the kind and nature of the treating amine or ammonium, the treating temperature may vary from 140° C. to 230° C., preferably from 150° C. to 200° C.

The cation exchange membrane improved by the amine salt treatment and then the heat treatment represents a desirous high value of cation exchange performance, as was already referred to. For the use of electrolytic treatment of NaCl, the separating membrane may be pretreated in a boiling water bath for 30 minutes—an hour and before the practical use of the membrane. In this way, the electric resistance can be further decreased. It is also possible to pretreat the membrane in a bath of organic solvent or a mixture of the latter with water. The cation exchange membrane improved in any of the foregoing treatment disclosed herein above represent a highly superior ion exchange performance as well as a favorable value of electrical resistance during its service period, and thus, it can be used industrially in a very advantageous manner.

BRIEF DESCRIPTION OF THE DRAWING

The accompanying sole drawing represents the current efficiency of an improved membrane to be described latter in Example 14, relative to the degree of swelling as appearing after NaCl-electrolysis and in a 20%-NaOH solution developed during the course of the electrolysis. The membrane will be designated as N-110 membrane adapted for use in the electrolysis as to be executed in Example 14. The broken line represents the relation between the degree of swelling and the current efficiency as appearing after the execution of NaCl-electrolysis, the membrane having been preparatorily treated with trimethyl benzyl ammonium chloride as will be later set forth therein.

DETAILED DESCRIPTION OF PREFERRED EXAMPLES

EXAMPLE 1

A sheet of cation exchange membrane "NAFION 390" procured from E. I. DuPont, and of the sulfonic acid active fluororesin type being composed of a mutually stuck-on composition of two membrane elements "EW 1100" and "EW 1500", was dipped in an aqueous solution containing trimethylamine hydrochloride in the ratio of 1 mol/lit. for 17 hours. Then, the thus treated membrane was subjected to a heat treatment in an oven at 170° C. for 5 hours. And then, the membrane was dipped in a boiling water bath for 30 minutes and used as a cation exchange one in the electrolytic service for the treatment of NaCl. The electrolysis was executed under the conditions as shown in the following Table 1. Before the service the composite membrane was suspended in the electrolytic bath in such a state that the EW 1500 was faced towards the cathode. The membrane positioning mode will be same as before in the following several Examples.

TABLE 1

| | |
|---|---|
| Cathode | stainless steel |
| Anode | titanium-ruthenium oxide |
| Interelectrode Distance | 5 mm |
| Brine | 26%-NaCl aqueous solution |

TABLE 1-continued

| | |
|---|---|
| Rate of Decomposition | about 10% |
| Bath Temperature | 76 – 80° C. |
| Current Density | 20 A/$d_m^3$ |
| The resulted electrolytic data were as follows: | |
| Concentration of NaOH-solution appearing at the cathodic chamber | 22%; |
| Bath voltage | 3.4 volts which is lower than the initial operating voltage. |
| Current efficiency | 93% |

When compared with the electrolytic results under utilization of the same membrane "NAFION 390" which had been pretreated in a boiling water bath for 30 minutes, the following results were obtained.

| | |
|---|---|
| Concentration of NaOH-solution appearing at the cathodic chamber | 20%; |
| Bath voltage | 3.2 volts; |
| Current efficiency | 75%; |

It was found that the improved membrane used in the above Example 1 represented no reduction in the current efficiency even upon a continued electrolytic service for about three months. Thus, it was observed that the membrane improved as suggested in the present invention shows a superior ionic selective performance even upon an extended period of electrolytic service.

EXAMPLE 2

The same NAFION 390-membrane as was used in the foregoing Example 1 was dipped in an aqueous solution containing 0.17 mol of tributylamine hydrochloride at 60° C. for 4 hours. Then, the surfaces of the membrane was wiped, to remove excess liquid, with a filter paper, whereupon the membrane was subjected to a heat treatment at 160° C. for three hours and then dipped in a boiling water bath for 30 minutes. Then, the membrane was used for the treatment of NaCl-aqueous solution, as in the similar way in the foregoing Example 1.

| | |
|---|---|
| Current density: | 20 amperes/$dm^2$ |
| Bath temperature: | 72° C. |
| Concentration of caustic soda solution at cathodic chamber: | 22.4%. |
| Current efficiency: | 94.4%. |
| Bath voltage: | 3.42 volts. |

EXAMPLE 3–5

E. I. DuPont's cation exchange membrane, "NAFION 315", carrying as its active radicals, sulfonic acid radicals was prepared. This was of the -$SO_3H$-type. As the monoamine salt, isopropylamine hydrochloride; dimethylamine hydrochloride and tetramethylammonium chloride was successively used for the similar membranes. These membranes were used in each case, as the separator in the electrolysis of NaCl. The electrolytic conditions were same as those used in the foregoing Example 1. The results are shown in the following Table 2.

TABLE 2

| Example | monoamine salt | current efficiency | Concentration of caustic soda solution |
|---|---|---|---|
| 3 | isopropylamine hydrochloride | 91.4% | 23.4% |
| 4 | dimethylamine hydrochloride | 92.2% | 21.1% |
| 5 | tetramethylammonium chloride | 92.4% | 20.8% |

As a comparative Example 2, "NAFION 315"-membrane without subjected to the monoamine salt treatment, but dipped in a boiling water bath for 30 minutes and then used for the electrolytic treatment of NaCl under the same operating conditions as in the foregoing Example 1. The electrolytic results were:

| | |
|---|---|
| Concentration of NaOH-solution at cathodic chamber | 21%; |
| Current efficiency | 76%; |

Thus, it was found that the membrane improved by the present invention represents a high and superior cation-selecting performance.

EXAMPLE 6

The foregoing "N-315"-membrane was replaced by such one, as of "-$SO_3Na$"-type and the electrolysis was executed with isopropylamine hydrochloride under the similar operating conditions, as was referred to in Example 3. The membrane was used as the separating wall member. The results were as follows:

| | |
|---|---|
| Concentration of NaOH-solution at cathodic chamber | 22.6%; |
| Current efficiency | 86%. |

From the above it can be observed that in this case, the cation selecting performance was improved in a still better way than the case where the original "N-315"-membrane has been utilized. The degree of the improvement was better in the present case, using the membrane of the -$SO_3H$-type was used.

EXAMPLES 7–9

The membrane of "N-315"-membrane of the -$SO_3H$ type, was dipped in an aqueous solution of trimethylamine hydrochloride, 0.3 mol/lit at room temperature for 24 hours. Similar membranes were procured and prepared in the similar way and subjected each to a heat treatment at 160° C.; 180° C. and 225° C., for two hours, respectively. Then, these membranes were dipped in each case in a boiling water bath for 30 minutes and then brought into service for the electrolysis of NaCl and as the cation exchange membrane.

The results are shown in Table 3.

The electrolytic conditions were same as those used in the foregoing Example 1.

As a comparative Example 3, the membrane was dipped only in an aqueous solution containing trimethylamine hydrochloride, 0.3 mol/lit., at room temperature for 24 hours without execution of the heat treatment, but further subjected to a dipping treatment in a boiling water bath for 30 minutes. The electrolytic results are shown simultaneously in the same Table 3.

TABLE 3

| Example | Heat Treating Temperature °C. | Current Efficiency, % | Concentration of caustic soda solution |
|---|---|---|---|
| 7 | 160 | 91.6 | 20.8% |
| 8 | 180 | 92.0 | 22% |
| 9 | 225 | 91.8 | 22% |
| Comparative Example 3 | — | 82 | 21% |

It can be well acknowledged for the purpose of the invention that the heat treatment of the membrane is requisite after the execution of the amine salt treatment and for the improvement of the cation-selecting performance of the membrane.

EXAMPLE 10

NAFION 390-membrane was fixed positioned on one end of an open-ended cylinder and a pool of same aqueous trimethylamine hydrochloride solution as was used in the foregoing Example 1 was kept in the cylindrical vessel or frame in contact with one surface of the membrane said surface being composed of the "EW 1500"-membrane element. The contacting temperature was room one, while the contacting period extended for four hours. The amine salt treatment was executed in this way.

The membrane was further treated thermally at 160° C. for 3 hours and then dipped in a boiling water bath for 30 minutes. Upon directing the thus treated membrane surface towards the cathode and then used in the electrolytic treatment of an aqueous NaCl-solution under similar operating conditions as in the foregoing Example 1. The results were:

| | |
|---|---|
| Concentration of caustic soda solution | 20.3%; |
| Current efficiency | 92.4%; |
| Bath voltage | 3.22 volts at 74° C. |

EXAMPLE 11-12

Cation exchange membranes of "N-110"(-SO$_3$H-type), carrying pendact type sulfonic acid radicals and procured from E. I. DuPont, were dipped in respective aqueous solutions, containing: trimethylamine hydrochloride; and isopropylamine hydrochloride, 0.5 mol/lit., respectively, and in the similar comparative Example 4-6, N,N-dimethylarycine hydrochloride; triethanolamine hydrochloride and ammonium chloride, 0.5 mol/lit., respectively at 100° C. for an hour, and were subjected each to a heat treatment at 160° C. for three hours, respectively. Further, as comparative Examples 7-8, the membranes were dipped in an aqueous solution, containing 20 wt.% of trimethylamine and secondary butylamine, respectively, at 80° C. for an hour, and at 160° C. for three hours, respectively.

These membranes were dipped in a boiling water bath for an hour and the resulted aqueous swelling degree was measured in each case. In addition, these membranes were used separately for the electrolytic treatment of a NaCl-aqueous solution in each case.

The resulted experimental data are shown in the following Table 4 wherein Comparative Example 9 represents the results by use of the original "N-110"-membrane.

TABLE 4

| | Kind of amine | Degree of Swelling, wt. % | Current Efficiency, % | 1*, % |
|---|---|---|---|---|
| Example | | | | |
| 11 | trimethylamine hydrochloride | 17 | 78 | 20.3 |
| 12 | isopropylamine hydrochloride | 17 | 76.4 | 19.7 |
| Comp. Example | | | | |
| 4 | N,N-dimethylgrycine hydrochloride | 25 | 58.2 | 20.6 |
| 5 | triethanolamine hydrochloride | 29 | 56.7 | 21.3 |
| 6 | ammonium chloride | 25 | 59.4 | 18.6 |
| 7 | trimethylamine | 17 | 60.2 | 19.9 |
| 8 | sec. butylamine | — | 61.9 | 21.2 |
| 9 | — | 26 | 57 | 20.1 |

Remarks:
1*concentration of caustic soda solution

EXAMPLE 13

A cation exchange membrane "NAFION N-110", of the -SO$_3$H-type carrying pendant type sulfonic acid radicals and procured from E. I. DuPont was dipped in an aqueous solution containing trimethylbenzyl ammonium chloride, 1 mol/lit., and under refluxed conditions for about two hours.

This membrane was further subjected to a heat treatment at 160° C. for five hours. According infra red spectrum surface observation, it showed that respective absorptions were seen at 1050 and 970 cm$^{-1}$, respectively, by virtue of the presence of SO$_3{}^-$. These positions and strengths at 1050 and 970 cm$^{-1}$, respectively, were just same with those obtainable with the original corresponding membrane which has been untreated with amine salt.

Then, these membranes were dipped in a boiling water bath each for 30 minutes and used separately for the electrolytic treatment of NaCl under the same conditions as was disclosed in the foregoing Example 1, and as the cation exchange membrane in each case.

Although the initial bath voltage showed a relatively high value, however, it dropped to 3.2 volts after lapse of one day. The current efficiency amounted to 67% for the production of 20.3% of NaOH.

An untreated membrane "N-110" was dipped in a boiling water bath for 30 minutes and then used as the cation exchange membrane for the similar purpose under the same operating conditions to treat NaCl as before, the current efficiency amounted to 58% for producing 21.4%-NaOH. This means a considerably lower value. The bath voltage was 3.0 volts. From these results, the superior cation selecting permeability may be clearly seen of the amine salt-treated membranes.

After lapse of 48 hours of the electrolytic treatment of the aqueous NaCl-solution with use of the amine salt-treated membrane, the latter was washed with water and then dried up. When observed on the infra red spectrums, it was found that otherwise appearing absorptions caused by the presence of benzyl radical and at 700 and 750 cm$^{-1}$, respectively, had been completely disappeared, showing those obtainable with untreated N-110 membranes.

It may be well supposed that during two day-electrolytic treatment period of NaCl, the amine salt has been completely separated.

When observed with ultra violet spectrum, it was observed that the trimethylammonium chloride aqueous solution showed $\lambda_{max}$-value at 260μ.

When said N-110 membrane was dipped in a trimethylbenzyl ammonium chloride aqueous solution at 80° C. for about an hour and the amine salt aqueous solution was quantitatively analized with UV-spectrum before and after the treatment, it was found that the amine salt was consumed during the treatment in the specific quantity of $0.9 \times 10^{-3}$ mol/g dry resin, and that the amine salt was reacted substantially in one-to-one reacting ratio with the ion-exchangeable radicals present in and on the membrane substrate.

From the foregoing, it may be well supposed that by the foregoing amine salt treatment, an ion complex of $(SO_3^-)(N^+)$ is once formed which can be, however, easily separated off in the course of the electrolytic treatment of NaCl.

EXAMPLE 14

When the "NAFION N-110"-membrane treated with trimethylbenzyl ammonium chloride which was used in the foregoing Example 13, and then heat treated, is dipped in a boiling water bath for 30 minutes, it represents an equeous swelling rate of about 11%. When this membrane is used for the electronic treatment of NaCl under the operating conditions as set forth hereinbefore in Table 1 and at a concentration, 20% of the NaOH present in the cathodic chambers the results will be:

| Current efficiency | 69%; |
|---|---|
| Bath voltage | 3.15 volts; |

After lapse of three days, the membrane is taken out and the rate of swelling thereof in a 20%-NaOH aqueous solution, it will amount to about 14%.

On the other hand, when a sheet of membrane "NAFION N-110" is dipped an aqueous NaOH-solution at 80° C. for an hour, the lower will be the rate of swelling with increased concentration of the NaOH-solution. When these membranes are used for the electrolysis of NaCl under the operating conditions as set forth in the foregoing Table 1 and at a concentration of 20% of NaOH-solution present in the cathodic chamber, the current efficiency will vary with increase of the degree of swelling. With lower rate of swelling of the membrane treated beforehand with higher concentration of NaOH-solution, the current efficiency and the bath voltage will be higher.

After lapse of three days of electrolytic treatment the membrane is taken out and subjected again to measurement of the swelling degree in a 20%-NaOH-aqueous solution, the swelling degree is found to have been varied, as shown on the attached drawing.

When the membrane is treated with an aqueous solution of trimethyl benzyl ammonium chloride and then used for the desired electrolysis, the degree of swelling being 14%, the treated membrane shows a current efficiency of 69% and a bath voltage of 3.15 volts, while the corresponding caustic soda-treated membrane showing the similar degree of swelling: 14%, shows a current efficiency of 61%, respectively. Therefore, it will be seen that with same degree of swelling, the amine salt-treated membrane shows a rather favorable effect. In this case, the quantity of ion exchange radicals: ($-SO_3Na$), can be deemed as subject to no change. When the respective concentration of $Na^+$ and $OH^-$ present in the membrane substrate are expressed by $\overline{C_{Na}}$ and $\overline{C_{OH}}$, the ratio of $\overline{C_{OH}}/\overline{C_{Na}}$ will be same in the both. Now assuming the respective moving velocities of $OH^-$-ions and $Na^+$-ions are expressed by $\overline{U_{OH}}$ and $\overline{U_{Na}}$, then the ratio between the both will be:

$$\overline{U_r} = \overline{U_{OH}} / \overline{U_{Na}}$$
$$= \frac{1}{(\overline{C_{OH}}/\overline{C_{Na}})} \left( \frac{100}{C_{eff}} - 1 \right)$$

When $\overline{U_r}$ is calculated from this formula, its value for the membranes treated with trimethylbenzyl ammonium chloride will be lower by about 30% in comparison with that of the membranes which have not been subjected to such salt treatment. Although limitative to the present invention, the above difference may be attributed to the fact that the membranes subjected to amine salt treatment as suggested herein represent generally a substantially improved current efficiency and with least possible increase of the bath voltage.

The embodiments of the invention in which an exclusive property or privilege is claimed are as follows:

1. A process for the manufacture of cationic exchange membranes which employ sulfonic acid moieties as ion exchange radicals, comprising:
    (a) treating a fluorocarbon resin membrane with an ammonium salt of the formula $NR_1R_2R_3R_4X$ wherein $R_1$ is alkyl, aryl, aralkyl, or a halogen derivative of any one thereof; $R_2$, $R_3$, and $R_4$ are the same or different and are hydrogen, or alkyl, aryl, aralkyl, or a halogen derivative of any one thereof; and X is F, Cl, Br, I, OH, $NO_3$, a carboxylic acid radical, or an inorganic acid radical; and
    (b) heating the treated membrane to a temperature of from about 150° to about 200° C.

2. The process of claim 1, wherein the treating accomplished by dipping the membrane in a solution of the ammonium salt for a period of from about 2 hours up to one week, at a temperature between room temperature and the boiling point of the ammonium salt solution.

3. The process of claim 2, wherein the heating is for a period of from several minutes up to about 24 hours and the temperature is from about 140° to about 230° C.

4. The process of claim 2, wherein the amine salt is selected from the group consisting of: trimethylamine hydrochloride; tributylamine hydrochloride; isopropylamine hydrochloride; dimethylamine hydrochloride; tetramethylamine hydrochloride; and trimethylbenzylammonium chloride.

5. The process of claim 2, wherein the amine salt is trimethylamine hydrochloride.

6. The process of claim 1, wherein the membrane is further subjected to immersion in boiling water for from about 30 to about 60 minutes.

7. The process of claim 1, wherein the heating is for a period of from several minutes up to about 24 hours.

8. The process of claim 1, wherein only one side of the membrane is coated with the amine salt.

9. The process of claim 1, wherein the alkyl, aryl and aralkyl moieties have not more than eight carbon atoms.

* * * * *